United States Patent
Ueno et al.

(10) Patent No.: US 10,197,872 B2
(45) Date of Patent: Feb. 5, 2019

(54) LIQUID CRYSTAL DISPLAY DEVICE

(71) Applicant: Mitsubishi Electric Corporation, Tokyo (JP)

(72) Inventors: Takahiro Ueno, Kumamoto (JP); Hisatomo Ota, Kumamoto (JP); Shingo Sonoda, Kumamoto (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/741,770

(22) PCT Filed: Sep. 27, 2016

(86) PCT No.: PCT/JP2016/078330
§ 371 (c)(1),
(2) Date: Jan. 4, 2018

(87) PCT Pub. No.: WO2017/057303
PCT Pub. Date: Apr. 6, 2017

(65) Prior Publication Data
US 2018/0196298 A1 Jul. 12, 2018

(30) Foreign Application Priority Data

Oct. 1, 2015 (JP) ................................ 2015-195655

(51) Int. Cl.
*G02F 1/1345* (2006.01)
*G02F 1/1339* (2006.01)
(Continued)

(52) U.S. Cl.
CPC ........ *G02F 1/13458* (2013.01); *G02F 1/1339* (2013.01); *G02F 1/1343* (2013.01);
(Continued)

(58) Field of Classification Search
CPC .............. G02F 1/13458; G02F 1/1339; G02F 1/13452; G02F 1/133514; G02F 1/1368
See application file for complete search history.

(56) References Cited

U.S. PATENT DOCUMENTS 6,690,032 B1 * 2/2004 Umetsu ................ G02F 1/1345
257/621
8,149,371 B2 * 4/2012 Oohira ................ G02F 1/1333
349/112

(Continued)

FOREIGN PATENT DOCUMENTS

JP 2008-299161 A 12/2008
JP 2009-020273 A 1/2009
(Continued)

OTHER PUBLICATIONS

International Search Report issued in PCT/JP2016/078330; dated Nov. 29, 2016.

*Primary Examiner* — Hoan C Nguyen
(74) *Attorney, Agent, or Firm* — Studebaker & Brackett PC (57) ABSTRACT

A liquid crystal display apparatus includes a conductive paste, which connects a connection pad in a TFT array substrate and a transparent conductive film in a color filter substrate, and a ridge which is disposed adjacent to a conductive paste in a surrounding region of the TFT array substrate. A sealing member located between the color filter substrate and the TFT array substrate convexly extends in a direction from a display region to a surrounding region to form the ridge.

8 Claims, 6 Drawing Sheets

ENLARGED VIEW OF A PORTION (51) Int. Cl.
*G02F 1/1343* (2006.01)
*G02F 1/1335* (2006.01)
*G02F 1/1368* (2006.01)

(52) U.S. Cl.
CPC ........ *G02F 1/1345* (2013.01); *G02F 1/13452* (2013.01); *G02F 1/1368* (2013.01); *G02F 1/133514* (2013.01)

(56) References Cited

U.S. PATENT DOCUMENTS

| | | |
|---|---|---|
| 8,259,247 B2 | 9/2012 | Sugiyama et al. |
| 2005/0083472 A1* | 4/2005 | Nakanishi ............. G02F 1/1345 349/149 |
| 2009/0109369 A1* | 4/2009 | Morishita ......... G02F 1/133308 349/58 |
| 2012/0292105 A1 | 11/2012 | Fujita |
| 2014/0111724 A1* | 4/2014 | Nishino ................ G02F 1/1309 349/43 |

FOREIGN PATENT DOCUMENTS

| | | |
|---|---|---|
| JP | 2009-053472 A | 3/2009 |
| JP | 2010-122333 A | 6/2010 |
| JP | 2010-127974 A | 6/2010 |
| JP | 2011-170200 A | 9/2011 |
| JP | 2012-242432 A | 12/2012 |

* cited by examiner

ENLARGED VIEW OF A PORTION

LIQUID CRYSTAL DISPLAY DEVICE

TECHNICAL FIELD

The present invention relates to a liquid crystal display device which has a structure connecting a conductive film formed on a surface of a color filter substrate of a liquid crystal display panel and an electrode located on a side of a TFT array substrate using a conductive resin, and can be preferably used in a liquid crystal display panel adopting an IPS mode or FFS mode, for example.

BACKGROUND ART

In a liquid crystal display device adopting the IPS mode or FFS mode, for example, a charge on a surface of a liquid crystal display panel (referred to as "the LCD panel" hereinafter) which reduces a display quality needs to be transferred to a GND (ground) in accordance with characteristics of an electrode structure of driving a liquid crystal of the LCD panel. General as a method of transferring the charge is a method of forming a transparent conductive film (an ITO film as an example) on a surface of a color filter substrate (referred to as a CF substrate hereinafter) of the LCD panel, connecting the transparent conductive film to a GND electrode formed on a side of a TFT array substrate of the LCD panel (referred to as the TFT substrate hereinafter) using a conductive paste, and connecting the GND electrode to a GND wiring of a flexible circuit substrate such as a flexible printed circuit (FPC) to transfer the charge to outside.

However, this connection method using the conductive paste has a problem that a short circuit occurs between adjacent electrodes caused by the conductive paste diffusing and coming in contact with an adjacent other electrode or wiring, thereby causing a display defect, for example.

An insulating resin needs to be applied around the conductive paste to protect the electrode and wiring, so that there is a problem that the insulating resin comes in contact with the conductive paste, and a solvent contained in the insulating resin, for example, diffuses, thereby interfering with a connection reliability of the conductive paste.

Well-known to solve those problems is a method of shaping a pattern of an insulating film formed in a process of manufacturing the TFT substrate to provide a dam adjacent to the conductive paste, for example (Patent Document 1)

When a low-viscosity conductive paste which is easily diffused is applied, adopted is a method of attaching a thin material such as a tape material, because of a film thinness thereof, in a form of a dam in advance and removing the tape material after the conductive paste is applied, for example (Patent Document 2).

Alternatively, there is also a method of applying an insulating resin to provide a ridge in advance before applying the conductive paste (Patent Document 3).

PRIOR ART DOCUMENTS

Patent Documents

Patent Document 1: Japanese Patent Application Laid-Open No. 2010-122333
Patent Document 2: Japanese Patent Application Laid-Open No. 2008-299161
Patent Document 3: Japanese Patent Application Laid-Open No. 2012-242432

SUMMARY

Problem to be Solved by the Invention

Herein, the dam described in Patent Document 1 is disposed by deforming the pattern of the insulating film formed in the process of manufacturing the TFT substrate. However, as described in paragraph [0023] in Patent Document 1 and FIG. 4, the LCD panel includes a gap in an edge portion of a sealing member in a surrounding region of the TFT substrate, that is to say, between the CF substrate and the TFT substrate. Thus, particularly, when the low-viscosity conductive paste or insulating resin is applied near the edge portion of the sealing member, the conductive paste or the resin is transferred through a groove or the gap between the CF substrate and the TFT substrate by capillary action and diffused peripherally.

In both Patent Documents 2 and 3, an additional processing is performed on a material to be the ridge after the CF substrate and the TFT substrate is attached to each other, that is to say, after the LCD panel is formed, so that a new material to be the ridge is necessary. A complex shape specific to the ridge further increases difficulty in design and processing, so that a total number of manufacturing processes increases and productivity decreases to achieve the ridge.

In Patent Document 3, the insulating resin itself which is applied in advance to form the ridge is diffused, and an insulating film is formed on electrodes of the CF substrate and TFT substrate which are originally electrically connected to the conductive paste, thereby causing a conduction defect and interfering with the display quality.

The present invention has been made to solve the above-mentioned problems and an object of the present invention is to form an effective ridge which prevents a short circuit between electrodes on a TFT substrate occurring due to a diffusion of a conductive paste and also prevents a solvent, for example, contained in an insulating resin for protecting surrounding electrodes from being diffused and coming in contact with the conductive paste, thus does not interfere with a connection reliability of the conductive paste.

Means to Solve the Problem

A liquid crystal display device according to the present invention has a feature that it includes a first substrate having a first portion and a second portion; a connection pad formed on the first portion of the first substrate; a second substrate facing the second portion of the first substrate; a liquid crystal held between the first substrate and the second substrate; a sealing member being disposed between the first substrate and the second substrate around the second portion to hold the liquid crystal; a conductive film formed on a surface of the second substrate opposite to a surface facing the first substrate; a conductive resin being provided to extend from an upper portion of the connection pad to an upper portion of the conductive film to electrically connect the connection pad and the conductive film; and a ridge disposed adjacent to the conductive resin in the first portion, and the sealing member convexly extends in a direction from the second portion to the first portion to form the ridge.

Effects of the Invention

In an electrooptical display device according to the present invention, the ridge is molded in the process of applying the sealing member on the CF substrate or the TFT substrate, which is conventionally constructed as the process of manufacturing the LCD panel, using the same sealing member, thus the additional material and number of manufacturing processes are not necessary.

Moreover, the sealing member, which is the adhesive material to attach the CF substrate to the TFT substrate, also has the function of preventing the spread of the liquid crystal, thereby sufficiently having the function as the material of the ridge.

Furthermore, a fine and accurate application is conventionally required in applying the sealing member, and the application technique of molding the ridge having the complex shape can be sufficiently achieved by the same specification of facility, thus the additional facility investment is not required.

DESCRIPTION OF EMBODIMENT(S)

Embodiments of the present invention is described with reference to the drawings hereinafter. In order to prevent an overlapping and redundant description, the same reference numerals as those described in each drawing will be assigned to an element having the same or corresponding function.

Embodiment 1

Figure 1:
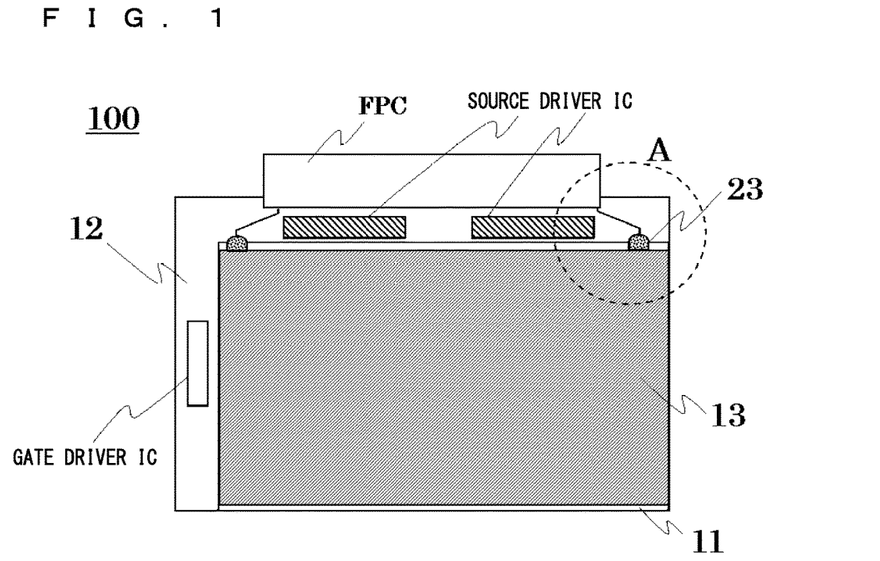
FIG. 1 A planar view illustrating a configuration of a liquid crystal display device according to an embodiment 1 of the present invention.
Figure 2:
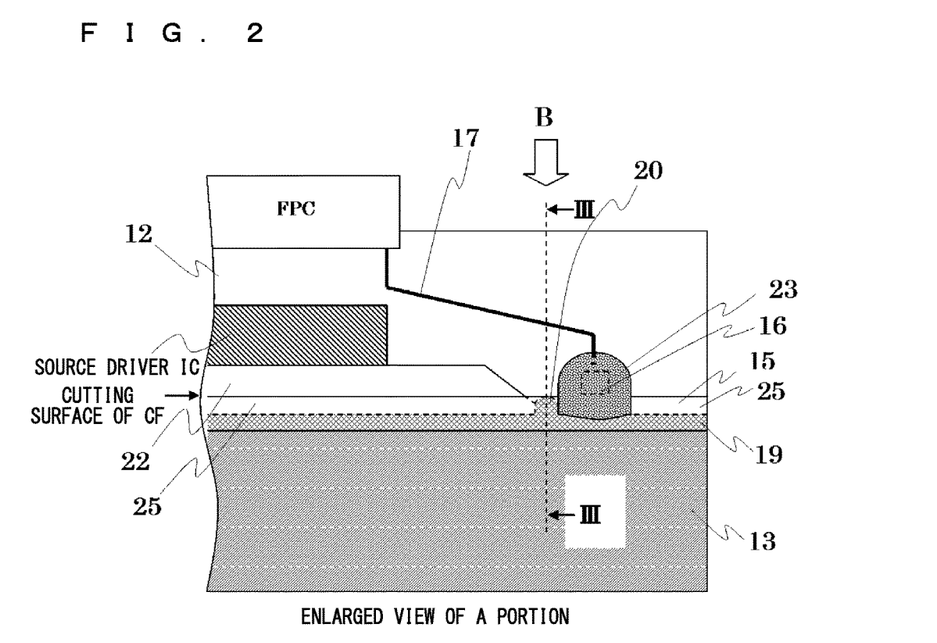
FIG. 2 An enlarged planar view enlarging a broken line portion A in FIG. 1.
Figure 3:
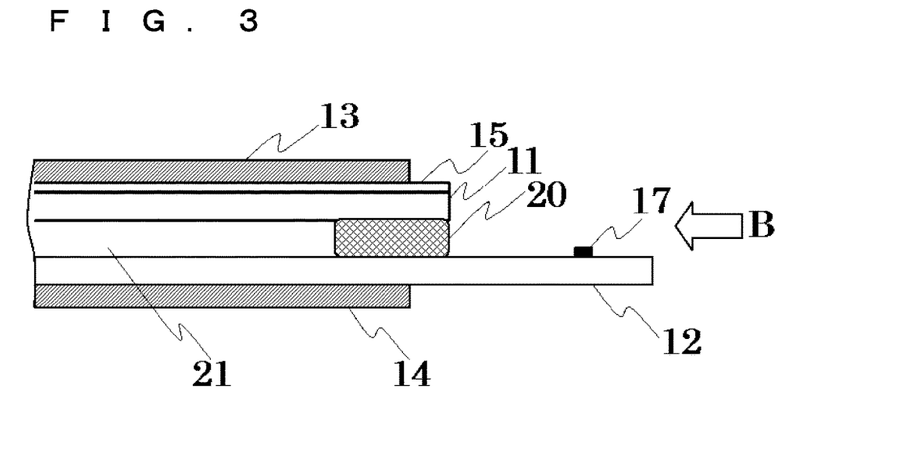
FIG. 3 A cross sectional view taken along a broken line illustrated in FIG. 2.
Figure 4:
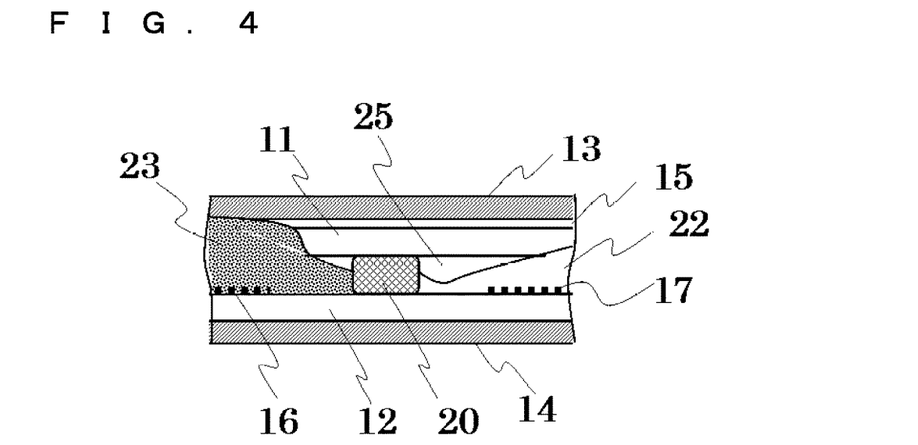
FIG. 4 A side view seen from a B direction illustrated in FIG. 2 and FIG. 3.

The embodiment 1 of the present invention is described in detail with reference to the drawings hereinafter. FIG. 1 is a planar view illustrating a whole configuration of a liquid crystal display device according to the embodiment 1. FIG. 2 is an enlarged planar view enlarging a broken line portion A including a conductive paste 23 (a conductive resin) illustrated in FIG. 1. FIG. 3 is a cross sectional view taken along a broken line illustrated in FIG. 2. FIG. 4 is a side view seen from a B direction illustrated in FIG. 2 and FIG. 3.

<<Configuration>>

A configuration of a liquid crystal display device 100 according to the present embodiment 1 is firstly described using FIG. 1 and FIG. 2 which is a partially enlarged view of FIG. 1. An LCD panel adopted to the liquid crystal display device 100 illustrated in FIG. 1 applies a FFS mode as a liquid crystal driving system, and a sealing member 19 is disposed on a surrounding part of a display region between a CF substrate 11 (a first substrate) and a TFT substrate 12 (a second substrate) to hold a liquid crystal 21. Furthermore, a CF side polarization plate 13 is provided on the CF substrate 11 and a TFT side polarization plate 14 is provided on the TFT substrate 12.

As is clear from FIG. 2 and FIG. 3, a transparent conductive film 15 (a conductive film) for eliminating electricity is formed to cover at least a display region (a second portion) on a side of a display surface of the CF substrate 11 (between the CF substrate 11 and the CF polarization plate 13, that is to say, on a surface of the CF substrate 11 opposite to a surface facing the TFT substrate 12), and the transparent conductive film 15 extends to an end portion of the CF substrate 11 to be easily connected to the GND.

A GND electrode 16 (a connection pad) is formed on a surface of the TFT substrate 12 (a surface on which the TFT array is formed) to be connected to the transparent conductive film 15. A conductive paste 23 (a conductive resin) is provided to connect the transparent conductive film 15 extending to the end portion of the CF substrate 11 and the GND electrode 16 formed on the TFT substrate 12.

Herein, as illustrated in the enlarged view FIG. 2, the sealing member 19 holding the liquid crystal 21 has a ridge 20 convexly extending to a side of the surrounding region (a first portion) in addition to the portion of holding the liquid crystal 21 in the display region (the second portion). The ridge 20 of the sealing member 19 is disposed in a portion adjacent to the conductive paste 23 and prevents a diffusion of the conductive paste 23 until the conductive paste 23 is hardened.

Furthermore, as illustrated in FIG. 2 and FIG. 3, in the present embodiment 1, a positional range of the ridge 20 is limited to the same position as an end of a cutting surface of the CF substrate 11 or slightly inside the end thereof, however, the ridge 20 can also interfere the diffusion of a protective resin 22 which protects the other electrode (not shown) on the surface of the TFT substrate 12. As described above, the ridge 20 is disposed in the predetermined position, thus the diffusion of the conductive paste 23 and the contact of the protective resin 22 with the conductive paste 23 can be prevented.

A commonly used material such as glass, plastic and an insulating member being a film-shaped resin is adopted to a base material of the CF substrate 11 and the TFT substrate 12, and a glass substrate is adopted in the present embodiment. The transparent conductive film 15 and the GND electrode 16 illustrated in FIG. 2 are formed of a conductive member such as a metal film and a transparent conductive film (for example: ITO film) on the surfaces of the CF substrate 11 and TFT substrate 12 which include the glass substrate as the base material. The sealing member 19 and the ridge 20 molded by the sealing member 19 mainly includes an insulating member such as epoxy as a base material. The protective resin 22 for protecting the electrodes is also the insulating member.

<<Manufacturing Method>>

As described above, in the present embodiment, the sealing member 19 which is an adhesive material is applied on the CF substrate 11 or the TFT substrate 12 to attach the CF substrate 11 to the TFT substrate 12 and hold the liquid crystal 21, and the ridge 20 is molded using the same material as the sealing member 19 at the same time. Processes of manufacturing the LCD panel is described in detail in sequence hereinafter.

Step 1: Process of Applying Sealing Member

Firstly, the sealing member 19 which is the adhesive material is applied on the CF substrate 11 or the TFT substrate 12 to attach the CF substrate 11 to the TFT substrate 12 and hold the liquid crystal 21. Described is a case of applying the sealing member 19 on the TFT substrate 12 using a dispenser herein. The sealing member 19 is also applied as the ridge 20 convexly extending to the side of the surrounding region (the first portion) in addition to the portion of surrounding the display region (the second portion) to hold the liquid crystal 21. A region where the ridge 20 is applied is estimated so that an end of the ridge 20 (an extending direction) is molded in the same position as the end of the cutting surface of the CF substrate 11 or slightly inside the end thereof after a process of overlapping the TFT substrate 12 with the CF substrate 11 is completed in the subsequent step. That is to say, the region where the ridge 20 is applied is appropriately determined with estimating a variation in application of the sealing member 19 and a variation in overlap between the CF substrate 11 and the TFT substrate 12. Furthermore, a connection terminal on the TFT substrate 12 is disposed outside the cutting surface of the CF substrate 11, thus the ridge 20 does not reach the connection terminal after the subsequent overlapping process.

Well-known as the method of applying the sealing member 19 is a method using a screen printing method as well as a method of using a dispenser, and also in this case, the ridge 20 can be formed by adding a predetermined region where the sealing member 19 is applied for the ridge 20 to a screen plate in addition to the region where the sealing member 19 is applied to hold the liquid crystal 21.

Step 2: Process of Overlapping and Sealing Liquid Crystal

Next, the process of overlapping the CF substrate 11 with the TFT substrate 12 and sealing the liquid crystal 21 is described. In the present embodiment, a predetermined amount of the liquid crystal 21 is dropped on one of the CF substrate 11 and the TFT substrate 12, and then, the CF substrate 11 and the TFT substrate 12 are overlapped with each other and the sealing member 19 is hardened to keep a predetermined gap therebetween. Herein, since the sealing member 19 and the ridge 20 are integrally molded, the ridge 20 which is tightly attached to the CF substrate 11 and the TFT substrate 12 without gap is generated. As described above, as a result of the overlapping, the forming region of the ridge 20 is located in the same position as the end of the cutting surface of the CF substrate 11 or slightly inside the end thereof.

A vacuum injection method is well known as the method of sealing the liquid crystal 21 as well as the falling-drop method adopted in the present embodiment, and the ridge 20 can be formed using the dispenser or the screen printing method in the manner similar to the falling-drop method described above except for providing an inlet from which the liquid crystal 21 is injected after applying the sealing member 19 and overlapping the substrates.

Step 3: Process of Dividing LCD Panel

Generally required in manufacturing the LCD panel is the process of dividing the LCD panel from a mother glass substrate and separating into several pieces after the liquid crystal 21 is injected and then the sealing member 19 is hardened. The process of dividing the LCD panel to remove an unnecessary region around the LCD panel is necessary even when the LCD panel is large in size and only one piece of LCD panel can be obtained from the mother glass substrate. In the present embodiment, as a result of the overlapping described above, the forming region of the ridge 20 is located in the same position as the end of the cutting surface of the CF substrate 11 or slightly inside the end thereof, thus there is no particular need for consideration at the time of dividing the CF substrate 11, and there is no difference from a normal process of dividing the LCD panel.

Step 4: Process of Applying Conductive Paste

Next, the process of applying the conductive paste 23 is described. As illustrated in FIG. 2 and FIG. 4, the conductive paste 23 is applied to connect the transparent conductive film 15 extending to the end portion on the surface of the CF substrate 11 described above and the GND electrode 16 formed on the TFT substrate 12 described above using the dispenser.

Herein, as illustrated in FIG. 2, the ridge 20 is formed so that it does not reach the GND electrode 16 on the TFT substrate 12 in Step 2 described above. Furthermore, as illustrated in the cross sectional view in FIG. 3, there is the ridge 20 tightly attached to the CF substrate 11 and the TFT substrate 12 without gap. Thus, as illustrated in FIG. 4, the conductive paste 23 is not transferred and diffused through a groove or a gap 25 between the CF substrate 11 and the TFT substrate 12.

Step 5: Application of Insulating Resin

In the present embodiment, as illustrated in FIG. 2 and FIG. 4, the insulating protective resin 22 is applied on a predetermined region in the TFT substrate 12 to protect electrodes (not shown), a wiring 17, and moreover a driver IC which is mounted in a form of COG after the driver IC and a FPC, for example, are mounted on the TFT substrate 12. That is to say, as illustrated in FIG. 2, the insulating protective resin 22 needs to be applied over a relatively large range, and is applied on the predetermined region manually or using the dispenser. Herein, since the ridge 20 having a convex shape is formed between the region where the protective resin 22 is applied and the region where the conductive paste 23 is applied, the protective resin 22 is not diffused to come in contact with the conductive paste 23.

Modification Example of Embodiment 1

Figure 5:
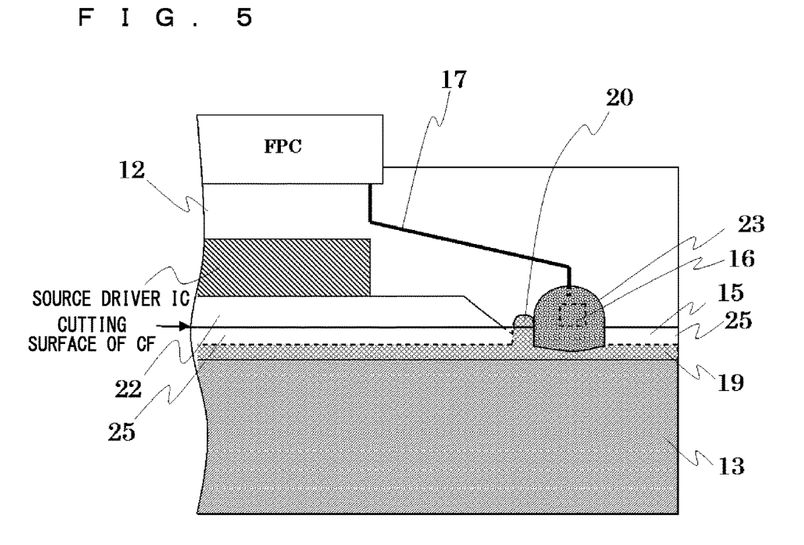
FIG. 5 A planar view enlarging a part of a liquid crystal display device according to a modification example of the embodiment 1 of the present invention.

In the process of applying the sealing member according to the embodiment 1 described above, the sealing member 19 is applied so that the end of the ridge 20 is located in the same position as the end of the cutting surface of the CF substrate 11 or slightly inside the end thereof after the process of overlapping the TFT substrate 12 with the CF substrate 11 is completed in addition to the portion of surrounding the display region to hold the liquid crystal 21. However, as illustrated in FIG. 5 which is the planar view enlarging a part of the liquid crystal display device according to the modification example of the embodiment 1 of the present invention (the broken line portion A), when the TFT substrate 12 and the CF substrate 11 can be divided from each other in the subsequent process of dividing the LCD panel, the ridge 20 may protrude outside the cutting surface of the CF substrate 11. In the above case, the excess diffusion of the protective resin 22 can be prevented even when the conductive paste 23 and the protective resin 22 are applied more excessively.

Embodiment 2

Figure 6:
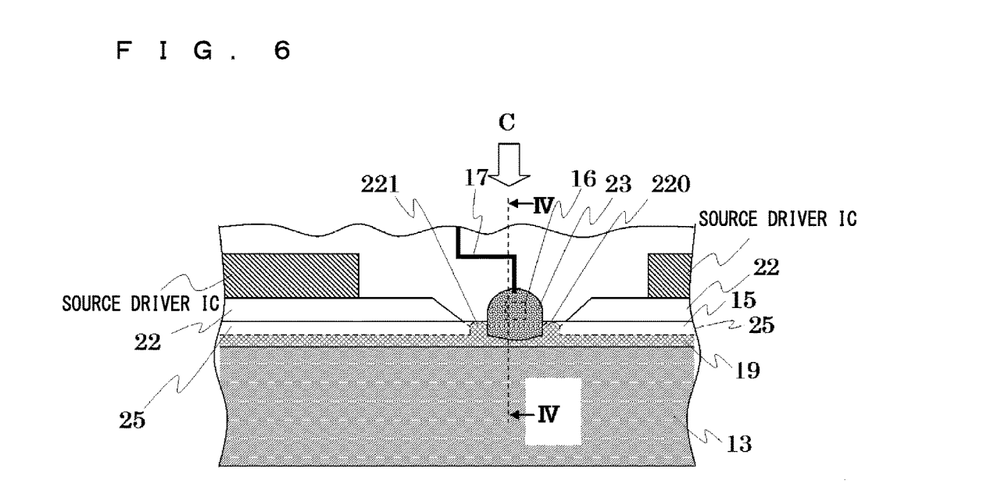
FIG. 6 A planar view enlarging a broken line portion A in a liquid crystal display device according to an embodiment 2 of the present invention.
Figure 7:
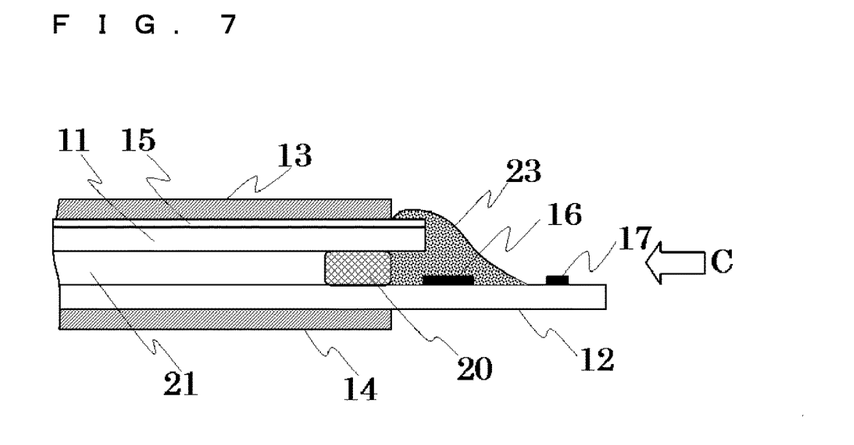
FIG. 7 A cross sectional view taken along a broken line IV-IV illustrated in FIG. 5.
Figure 8:
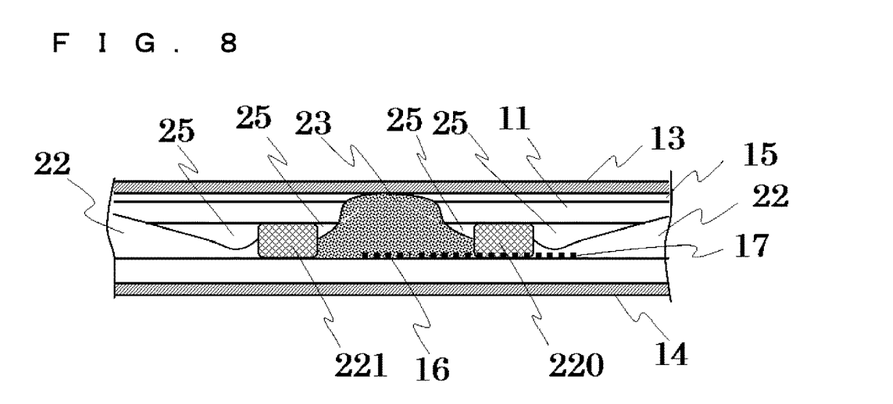
FIG. 8 A side view seen from a C direction illustrated in FIG. 5 and FIG. 6.

The embodiment 2 of the present invention is described in detail with reference to the drawings hereinafter. FIG. 6 is an enlarged planar view enlarging a surrounding part of the conductive paste 23 disposed in the liquid crystal display device 100 according to the embodiment 2 of the present invention. FIG. 7 is a cross sectional view taken along a broken line IV-IV illustrated in FIG. 6. FIG. 8 is a side view seen from a C direction illustrated in FIG. 6 and FIG. 7.

<<Configuration>>

As illustrated in FIG. 6 and FIG. 8, in the LCD panel adopted to the liquid crystal display device 100 according to the present embodiment, the sealing member 19 holding the liquid crystal 21 has a ridge 220 and a ridge 221 in two points convexly extending to the side of the surrounding region in addition to the portion to hold the liquid crystal 21. The ridges 220 and 221 of the sealing member 19 are disposed to sandwich the conductive paste 23 and come in contact with both the right and left sides thereof, and prevent the diffusion of the conductive paste 23 until the conductive paste 23 is hardened. As is clear from FIG. 7, the transparent conductive film 15 for eliminating electricity is formed to cover at least the display region on the surface of the CF substrate 11 (on the side of the display surface, between the CF substrate 11 and the CF polarization plate 13), and the transparent conductive film 15 extends to the end portion of the CF substrate 11 to be easily connected to the GND.

The GND electrode 16 is formed on the surface of the TFT substrate 12 (the surface on which the TFT array is formed) to be connected to the transparent conductive film 15. Furthermore, the conductive paste 23 is provided to connect the transparent conductive film 15 extending to the end portion of the CF substrate 11 and the GND electrode 16 formed on the TFT substrate 12.

In the present embodiment, the liquid crystal driving system, the configuration of the CF substrate 11 (the first substrate) and the TFT substrate 12 (the second substrate), and the position where the conductive paste 23 is applied, for example, are similar to those in the embodiment 1 described above, thus the detailed description is omitted.

As illustrated in FIG. 6, in the present embodiment, the ridges 220 and 221 having the convex shape are molded to be located on the both sides of the conductive paste 23 using the same material as that of the sealing member 19. The ridges 220 and 221 interfere with the diffusion of the conductive paste 23 in the manner similar to the embodiment 1 described above and also interfere with the protective resin 22 which protects the other electrodes (not shown) located in the both sides of the conductive paste 23 on the surface of the TFT substrate 12, thereby preventing a contact of the protective resin 22 with the conductive paste 23.

Each end of the ridges 220 and 221 are molded in the same position as the end of the cutting surface of the CF substrate 11 or slightly inside the end thereof in the manner similar to the embodiment 1 described above, thus the CF substrate 11 can be easily divided subsequently.

<<Manufacturing Method>>

Steps 1 to 4

As described above, in the present embodiment, the sealing member 19 holding the liquid crystal 21 has the ridge 220 and the ridge 221 convexly extending to the side of the surrounding region in addition to the portion to hold the liquid crystal 21. The ridges in the two points can be easily achieved by correcting an imaging range of the dispenser at the time of applying the sealing member 19 in Step 1 described in the embodiment 1. Alternatively, in the method using the screen printing method, the ridges can be easily achieved by correcting the screen plate. Since the other manufacturing method in Steps 1 to 4 is similar to that in the embodiment 1 described above, the detailed description is omitted.

In the meanwhile, as illustrated in FIG. 6 and FIG. 8, there are the ridges 220 and 221 tightly attached to the CF substrate 11 and the TFT substrate 12 without gap. Thus, as illustrated in FIG. 8, the conductive paste 23 is not transferred and diffused through the groove or the gap 25 between the CF substrate 11 and the TFT substrate 12.

Step 4: Application of Insulating Resin

In the present embodiment, as illustrated in FIG. 6 and FIG. 8, the insulating protective resin 22 is applied on the predetermined region in the TFT substrate 12 to protect electrodes (not shown), the wiring 17, and moreover the driver IC which is mounted in the form of COG after the driver IC and the FPC, for example, are mounted on the TFT substrate 12. That is to say, as illustrated in FIG. 6, the insulating protective resin 22 needs to be applied over a relatively large range on both the right and left sides of the conductive paste 23, and is applied on the predetermined region manually or using the dispenser. Herein, since the ridges 220 and 221 in the two points are formed between the region where the protective resin 22 is applied and the region where the conductive paste 23 is applied, the protective resin 22 is not diffused to come in contact with the conductive paste 23.

First Modification Example of Embodiment 2

Figure 9:
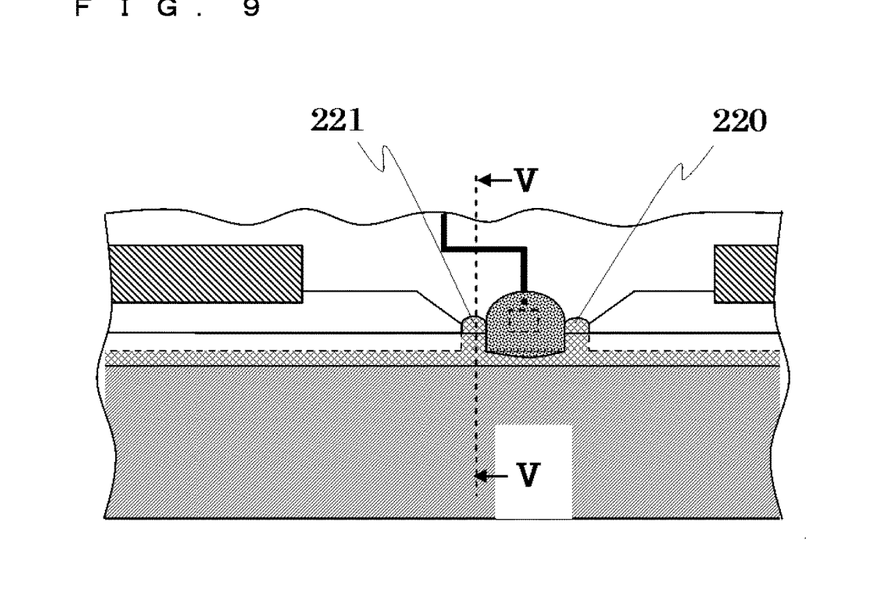
FIG. 9 A planar view enlarging a part of a liquid crystal display device according to a first modification example of the embodiment 2 of the present invention.
Figure 10:
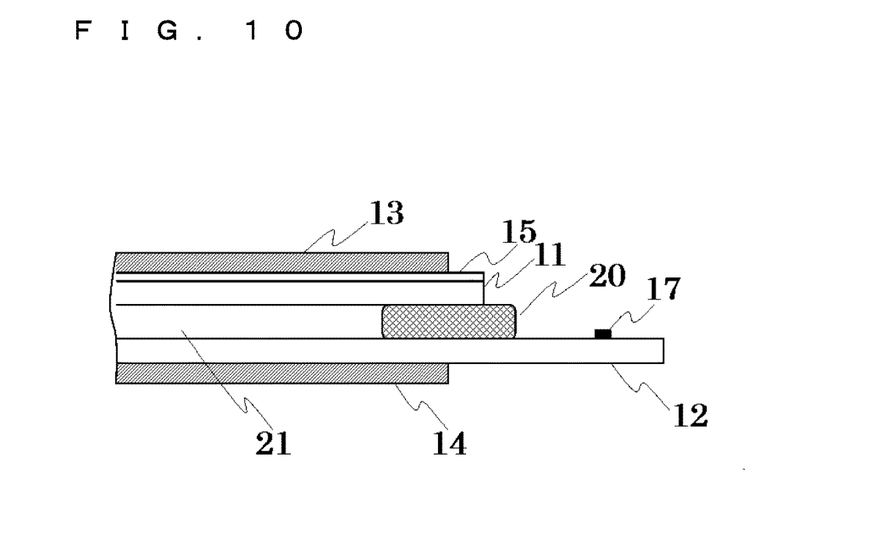
FIG. 10 A cross sectional view taken along a broken line V-V illustrated in FIG. 9.

The first modification example of the embodiment 2 of the present invention is described in detail with reference to the drawings hereinafter. FIG. 9 is an enlarged planar view enlarging a surrounding part of the conductive paste 23 disposed in the liquid crystal display device 100 according to first modification example of the embodiment 2 of the present invention. FIG. 10 is a cross sectional view taken along a broken line V-V illustrated in FIG. 9.

In the present embodiment, the ridges 220 and 221 in the two points molded by the sealing member 19 at the time of applying the sealing member 19 in the liquid crystal display device of the embodiment 2 described above are molded to protrude outside the cutting surface of the CF substrate 11 and disposed on the both sides of the conductive paste 23. Furthermore, the transparent conductive film 15 formed on the surface of the CF substrate 11 is connected to the GND electrode 16 formed on the surface of the TFT substrate 12 via the conductive paste 23.

Even when the conductive paste 23 is applied more excessively, the excess diffusion of the conductive paste 23 can be prevented by reason that the ridges 220 and 221 further protrude outside the cutting surface of the CF substrate 11.

Furthermore, even when the protective resin 22 which protects the other electrodes (not shown) located in the both sides of the conductive paste 23 on the surface of the TFT substrate 12 is applied more excessively, the excess diffusion of the protective resin 22 can be prevented by reason that the ridges 220 and 221 further protrude outside the cutting surface of the CF substrate 11. As a result, the contact of the protective resin 22 with the conductive paste 23 can be prevented, thus the effect similar to that in the second embodiment described above can be obtained.

Second Modification Example of Embodiment 2

Figure 11:
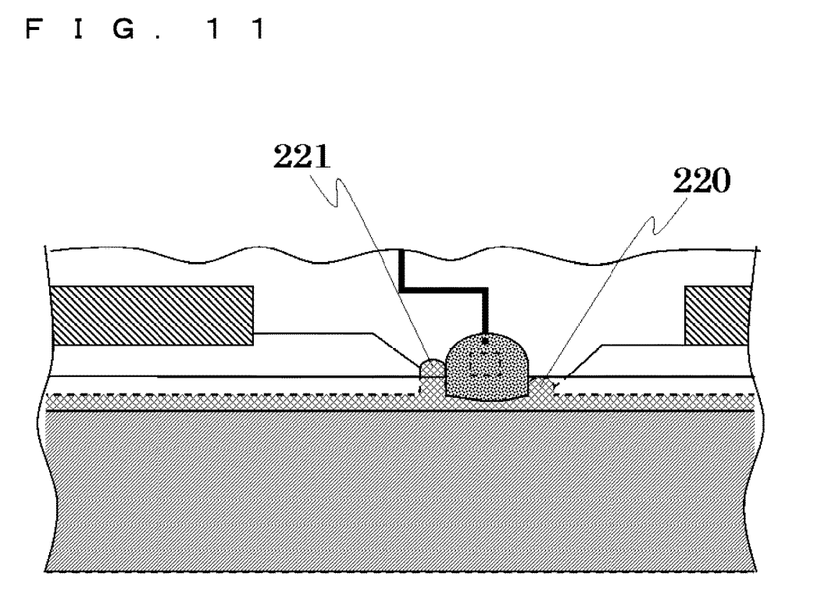
FIG. 11 A planar view enlarging a part of a liquid crystal display device according to a second modification example of the embodiment 2 of the present invention.

The second modification example of the embodiment 2 of the present invention is described in detail with reference to the drawings hereinafter. FIG. 11 is a planar view illustrating a configuration of a liquid crystal display device according to the second modification example of the embodiment 2 of the present invention.

In the present embodiment, in the process of applying the sealing member 19 described in the embodiment 2 described above, the ridge 221 molded by the sealing member 19 is formed to further extend outside the cutting surface of the CF substrate 11, and in the meanwhile, the ridge 220 is molded in the same position as the end of the cutting surface of the CF substrate 11 or slightly inside the end thereof, as illustrated in FIG. 11. The ridges 220 and 221 are molded to be disposed on the both sides of the conductive paste 23. The transparent conductive film 15 formed on the surface of the CF substrate 11 is connected to the GND electrode 16 formed on the surface of the TFT substrate 12 via the conductive paste 23. The ridge 220 and the ridge 221 effectively prevent the diffusion of the conductive paste 23 and the diffusion of the protective resin 22, thereby being able to prevent the contact of the protective resin 22 with the conductive paste 23, thus the effect similar to that in the embodiment 1 and the second embodiment described above can be obtained.

In the second modification example of the present embodiment 2, the end of the ridge 220 is located in the same position as the end of the cutting surface of the CF substrate 11 or slightly inside the end thereof, thus the CF substrate 11 can be divided easily.

In the embodiments 1 and 2 described above, in the liquid crystal display device adopting the IPS mode or the FFS mode, the transparent conductive film is formed on the surface of the CF substrate to eliminate the electricity, and the conductive paste is disposed to connect the transparent conductive film to the GND. In the meanwhile, a liquid crystal display device integrated with a touch panel, in which a capacity detection type touch panel is disposed on a display surface of a liquid crystal display device, becomes common recently. In the above case, there is a problem that a display driving signal in the liquid crystal display device has an influence on a touch sensing signal in the touch panel, thereby reducing a sensing sensitivity. As a measure against the problem described above, there is a case where a transparent conductive film is disposed on a surface of a CF substrate in an LCD panel for a shielding. Also in the above case, the transparent conductive film needs to be connected to the GND, thus the embodiments 1 to 3 of the present invention described above can be adopted. In the above case, the liquid crystal mode of the liquid crystal display device is not limited to the IPS mode or the FFS mode, but it is obvious that a TN mode or a VA mode can also be adopted.

Furthermore, in the embodiments 1 and 2 described above, the invention of the present application is described using the case of forming the transparent conductive film such as ITO on the surface of the CF substrate in the LCD panel as the method of transferring the charge on the surface of the LCD panel to the GND to eliminate the electricity, however, also adoptable is a configuration of providing a minute pattern made of a metal such as an aluminum alloy in a form of mesh on the surface of the CF substrate, for example, to achieve both conductivity and high optical transparency.

EXPLANATION OF REFERENCE SIGNS

11 CF substrate, 12 TFT substrate, 13, 14 polarization plate, 15 transparent conductive film, 16 GND electrode, 17 wiring, 19 sealing member, 20, 220, 221 ridge, 21 liquid crystal, 22 protective resin, 23 conductive paste, 100 liquid crystal display device.

The invention claimed is:

1. A liquid crystal display device, comprising:
   a first substrate having a first portion and a second portion;
   a connection pad formed on the first portion of the first substrate;
   a second substrate facing the second portion of the first substrate;
   a liquid crystal held between the first substrate and the second substrate;
   a sealing member being disposed between the first substrate and the second substrate around the second portion to hold the liquid crystal;
   a conductive film formed on a surface of the second substrate opposite to a surface facing the first substrate; and
   a conductive resin being provided to extend from an upper portion of the connection pad to an upper portion of the conductive film to electrically connect the connection pad and the conductive film, wherein
   the sealing member has a ridge disposed adjacent to the conductive resin in the first portion, and
   the sealing member convexly extends in a direction from the second portion to the first portion to form the ridge.

2. The liquid crystal display device according to claim 1, wherein the ridge is disposed on both sides of the conductive resin.

3. The liquid crystal display device according to claim 2, wherein
   an insulating resin for protecting a wiring is formed on the first portion on the first substrate, and
   the ridge is disposed between the conductive resin and the insulating resin.

4. The liquid crystal display device according to claim 2, wherein
   a tip portion of the ridge is located in a position identical with an end of a cutting surface of the second substrate or inside the end of the cutting surface of the second substrate.

5. The liquid crystal display device according to claim 1, wherein
   an insulating resin for protecting a wiring is formed on the first portion on the first substrate, and
   the ridge is disposed between the conductive resin and the insulating resin.

6. The liquid crystal display device according to claim 5, wherein
   a tip portion of the ridge is located in a position identical with an end of a cutting surface of the second substrate or inside the end of the cutting surface of the second substrate.

7. The liquid crystal display device according to claim 1, wherein
   a tip portion of the ridge is located in a position identical with an end of a cutting surface of the second substrate or inside the end of the cutting surface of the second substrate.

8. The liquid crystal display device according to claim 7, wherein
   a tip portion of the ridge is located in a position identical with an end of a cutting surface of the second substrate or inside the end of the cutting surface of the second substrate.

* * * * *